No. 624,176. Patented May 2, 1899.
W. R. CHISHOLM.
BASIN.
(Application filed Nov. 3, 1897.)
(No Model.)
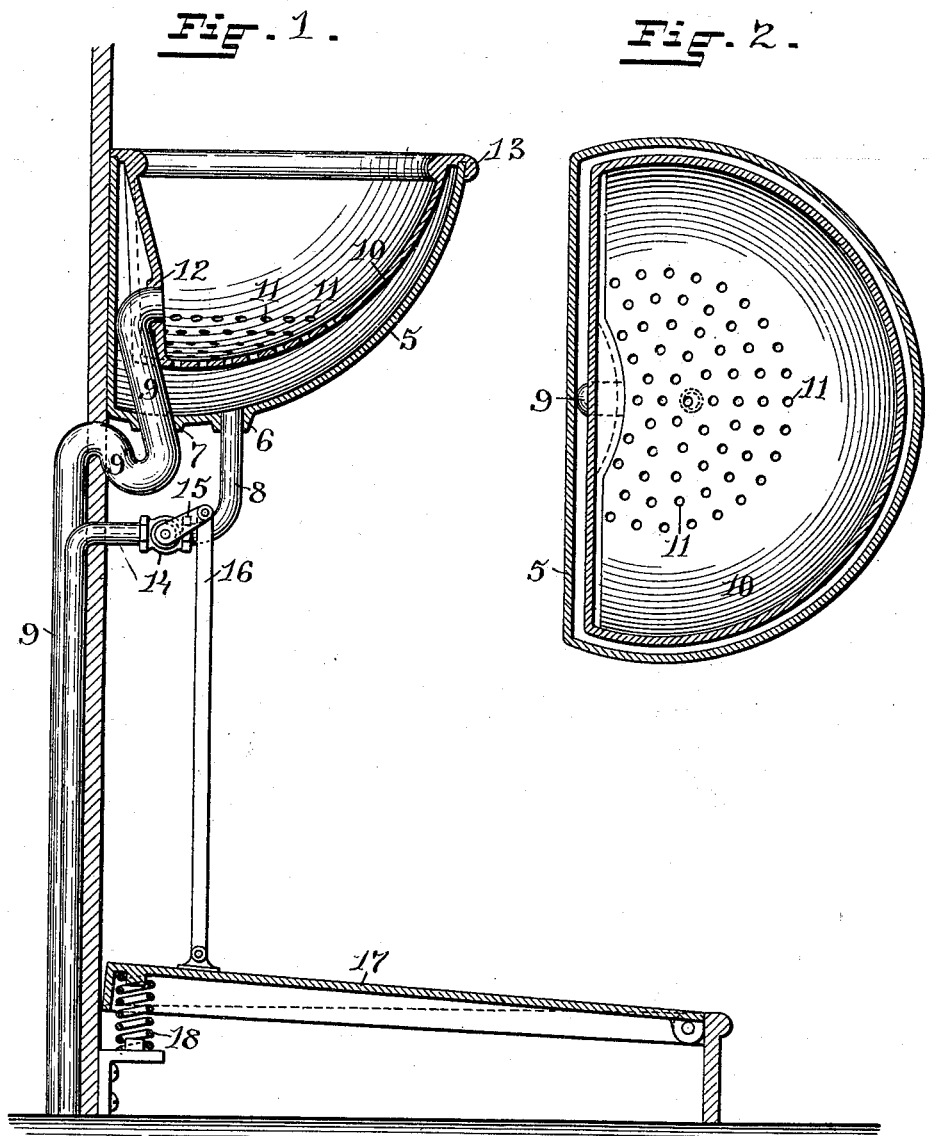
WITNESSES:
Chas. H. Luther Jr
B. M. Dimme
INVENTOR:
William R. Chisholm
by Joseph A. Miller & Co
Atty's

UNITED STATES PATENT OFFICE.

WILLIAM R. CHISHOLM, OF NEWARK, NEW JERSEY.

BASIN.

SPECIFICATION forming part of Letters Patent No. 624,176, dated May 2, 1899.

Application filed November 3, 1897. Serial No. 657,284. (No model.)

*To all whom it may concern:*

Be it known that I, WILLIAM R. CHISHOLM, of Newark, in the county of Essex and State of New Jersey, have invented certain new and useful Improvements in Basins; and I hereby declare that the following is a full, clear, and exact description of the same, reference being had to the accompanying drawings, forming part of this specification.

This invention has reference to improvements in basins adapted for use in water-closets, as slop-hoppers, urinals, or for other purposes.

The object of the invention is to so construct a basin that a body of water will at all times be contained therein.

Another object of the invention is to supply the basin with water at its lowest portion while the basin is being used.

Still another object is to withdraw the water, carrying the material thrown into the basin from the upper portion thereof above the inlet.

Another object of the invention is to produce a basin of the nature described so that the outer shell may readily be cleansed from time to time.

The invention consists in constructing a basin of two shells or parts, the outer of which contains and supports the inner shell.

The invention also consists in the peculiar combination, with the basin formed of two shells, the inner of which has an outlet at the upper portion, of a supply-pipe connected with the outer basin.

The invention further consists in the peculiar construction whereby water is supplied to the lower portion of the inner basin and the contaminated water is withdrawn from the same above the inlets.

The invention also consists in providing the peculiar basin with an inflow-pipe and a valve governing the inflow, together with means for automatically operating the valve.

Figure 1 represents a vertical sectional view of the improved basin furnished with supply and drain pipes and a valve in the supply-pipe operated by a depressible platform. Fig. 2 represents a cross-sectional view of the basin to more clearly show its construction.

Similar numerals of reference designate corresponding parts throughout.

Basins of this nature have heretofore been supplied with water from the top and have been drained from the lowest portion, the result being that the supply of water was not sufficient to cleanse the inner surface of the basin from the sediment or material which had once adhered thereto. No body of water could be secured to lift the material or substance cast into the basin from contact therewith.

In carrying my invention into practice I form the outer shell 5 of any desired shape and having two perforations 6 and 7 in the lower portion of its wall. In the perforation 6 is secured the supply or inlet pipe 8 for supplying water to the outer basin, and through the perforation 7 extends the drain-pipe 9, the lower end of which is connected in the usual manner with a sewer or receptacle. This drain-pipe may be supplied with a trap of the ordinary construction, or the pipe may be bent, as at 9', and the space between the drain-pipe and the edge of the perforation 7 is packed to prevent the leakage of water.

The inner basin or shell 10 is smaller in diameter than the outer shell, so that when placed therein a substantial space will be left between the two. Through the lower portion of this shell are formed the inlet perforations or ports 11 11. Through the rear portion of the shell is formed an opening 12, in which the outlet or drain pipe 9 is secured by any of the usual and well-known coupling devices or by merely inserting the end of the pipe in this opening. Surrounding the upper portion of the shell 10 is a supporting-lip 13, which is adapted to rest on the upper edge of the outer shell 5 and so support the inner shell, so that when it is desired to take the inner shell 10 out for the purpose of cleaning the front edge of the inner basin may be tipped up until the end of the pipe 9 is disengaged from the outlet 12, when the inner basin may be removed. The basin formed by the two shells may be inclosed with a casing, and a seat or cover may be supplied thereto, if found desirable.

The supply-pipe 8 is connected with a continuous water-supply pipe, and in this pipe 8 is located a valve 14, operated by a lever 15. Pivoted to this lever is a depending rod 16, the lower end of which is pivotally connected with the platform 17, hinged at one end and furnished at the other with a spring lifting device 18, which tends to lift the platform to the position shown in the drawings in solid lines and through the rod 16 operating the lever 15 to close the valve 19. When the platform is depressed, the valve is opened, and the water entering the outer shell 5 from the pipe 8 passes through the inlets or ports 11 11 to the interior of the shell, where it receives any substance cast into the inner shell to the level of the outlet or drain pipe 9, through which it is conveyed away, while a body of water will always be contained in the inner basin to receive and hold in suspension any material cast into the same, and a fresh supply of water is provided whenever the basin is used and during such use.

Having thus described my invention, I claim as new and desire to secure by Letters Patent—

1. The combination with a basin formed of two separable shells, one within the other, the inner shell having inlets near the bottom, of the inlet-pipe connected with the outer shell and the outlet-pipe connected with the inner shell above the perforations, as described.

2. In combination, an exterior shell furnished with an inlet, an inner shell having inlets near the lower portion connecting with the exterior shell and an outlet above said inlets, a supply-pipe connecting with the exterior shell, a valve in said supply-pipe, means for automatically operating the valve, and an outlet-pipe connecting with the outlet of the inner shell.

3. The combination with the shell, or chamber, 5, having perforations 6 and 7 and the supply-pipe connected with the perforation 6, of the basin, or shell, 10, supported within the shell 5, having the inlets 11 11 and the outlet 12, and the drain-pipe 9 extending through the perforation 7 of the outer shell and connected with the perforation 12 of the inner shell, as described.

4. The combination with the shell 5 having the perforations 6 and 7, the pipe 8 connected with the perforation 6, the shell 10, contained within the shell 5, having the inlets 11 11 and the perforation 12, and the drain-pipe 9 extending through the perforation 7 of the outer shell and connected with the perforation 12 of the inner shell, of the valve 14 located in the pipe 8, the lever 15 connected with the valve-stem, the rod 16 pivoted at the upper end to the lever, and the spring-operated platform 19 to which the lower end of the rod 18 is pivotally connected, as and for the purpose described.

In witness whereof I have hereunto set my hand.

WILLIAM R. CHISHOLM.

Witnesses:
   JOHN S. SCOTT,
   A. M. WOODRUFF.